United States Patent [19]

Lohmann et al.

[11] 4,124,651

[45] * Nov. 7, 1978

[54] PROCESS FOR THE PRODUCTION OF POLYAMIDE-POLYAMIDE-ACID COPOLYMERS

[75] Inventors: Dieter Lohmann, Pratteln; Peter Furrer, Bottmingen; Roland Darms, Therwil; Gerd Greber, Binningen, all of Switzerland

[73] Assignee: Ciba-Geigy Corporation, Ardsley, N.Y.

[*] Notice: The portion of the term of this patent subsequent to Jul. 8, 1992, has been disclaimed.

[21] Appl. No.: 825,324

[22] Filed: Aug. 17, 1977

Related U.S. Application Data

[63] Continuation of Ser. No. 719,319, Aug. 31, 1976, abandoned, which is a continuation of Ser. No. 552,824, Feb. 25, 1975, abandoned, which is a continuation-in-part of Ser. No. 384,644, Aug. 1, 1973, abandoned.

[30] Foreign Application Priority Data

Aug. 25, 1972 [CH] Switzerland ................. 12657/72

[51] Int. Cl.$^2$ ............................................. C08G 73/14
[52] U.S. Cl. .......................... 260/857 PA; 528/333; 528/338
[58] Field of Search ................... 260/78 TF, 857 PA

[56] References Cited

U.S. PATENT DOCUMENTS

| 3,471,444 | 10/1969 | Sherer | 260/78 TF |
|---|---|---|---|
| 3,894,114 | 7/1975 | Lohmann | 260/857 PA |

*Primary Examiner*—Paul R. Michl
*Attorney, Agent, or Firm*—Luther A. R. Hall

[57] ABSTRACT

A process for producing polyamide-polyamide-acid copolymers having an inherent viscosity of from 0.1 to 2.5 and cyclized derivatives thereof is disclosed, which process comprises reacting a polyamide-acid block having an average molecular weight of from 750 to 20,000 with a dicarboxylic acid dichloride and a diamine. The resultant polyamide-polyamide-acid copolymers are distinguished by good processing characteristics as well as good electrical, thermal and/or mechanical properties.

5 Claims, No Drawings

PROCESS FOR THE PRODUCTION OF POLYAMIDE-POLYAMIDE-ACID COPOLYMERS

This application is a continuation of application Ser. No. 719,319, filed Aug. 31, 1976, now abandoned; which in turn is a continuation of application Ser. No. 552,824, filed Feb. 25, 1975, now abandoned; which in turn is a continuation-in-part application of application Ser. No. 384,644, filed Aug. 1, 1973, now abandoned.

The present invention relates to a process for the manufacture of new polyamide/polyamide-acid copolymers and the derivatives cyclised to give the corresponding polyamide-polyimide copolymers, which are useful for the manufacture of industrial products.

It has been found that new polyamide/polyamide-acid copolymers having an inherent viscosity of 0.1 to 2.5, especially of 0.5 to 1.5, and possessing good processability coupled with good electrical, thermal and/or mechanical properties such as, for example, high flexural strength or resistance to aging, and derivatives cyclised to give the corresponding polyamide-polyamide copolymers can be prepared by reacting a polyamide-acid having an average molecular weight of 750 to 20,000 of formula I

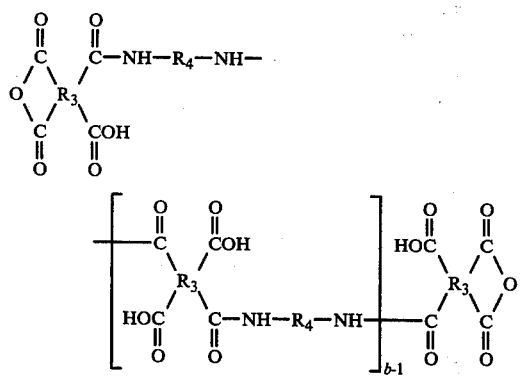

with a diamine of formula II

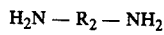

and with a dicarboxylic acid dichloride of formula III

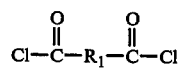

in a molar ratio of 1 to $a$ to $a$-1, or by reacting a polyamide-acid having an average molecular weight of 750 to 20,000, of formula IV

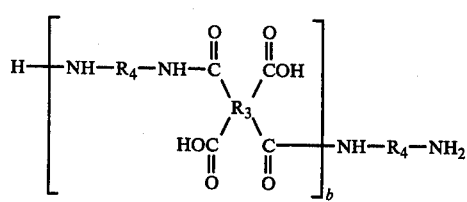

with a dicarboxylic acid dichloride of formula III and with a diamine of formula II, in a molar ratio of 1 to $a$ to $a$-1, in which formulae I to IV
$a$ represents an integer from 8 to 100, and
$b$ represents an integer from 2 to 100,
with the proviso that, when $b$ represents an integer from 8 to 100, $a$ represents an integer at least equal to $b$, $R_2$ and $R_4$ independently of one another denote a monocyclic, a condensed polycyclic or an uncondensed bicyclic aromatic radical in which latter radical the aromatic nuclei are linked to one another through a bridging member, or denote a heterocyclic-aromatic radical, an aliphatic radical with at least two carbon atoms, a cycloaliphatic radical or an araliphatic radical, $R_1$ represents an aliphatic radical with at least two carbon atoms or a cycloaliphatic, carbocyclic-aromatic or heterocyclic-aromatic radical, the carbonyl groups being bonded to different carbon atoms, and $R_3$ represents a cycloaliphatic, carbocyclic-aromatic or heterocyclic-aromatic radical, wherein the carbonyl and carboxyl groups are bonded to different ring carbon atoms and adjoin each other in pairs, and the carbonyl groups of the anhydride end groups are located on adjacent ring carbon atoms, and, optionally cyclizing the resulting polyamide/polyamide-acid copolymer.

The inherent viscosity $\eta_{inh.}$ is calculated from the following equation:

$$\eta_{inh.} = \frac{\ln \frac{\eta}{\eta_o}}{c}$$

In this equation the symbols have the following meaning:
ln = natural logarithm,
$\eta$ = viscosity of the solution (0.5% by weight of the polymer in a suitable solvent, for example N,N-dimethylacetamide, N,N-dimethylformamide, N-methylpyrrolidone or concentrated sulphuric acid),
$\eta$ = viscosity of the solvent and
= concentration of the polymer solution in g of polymer/100 ml of solvent.

The viscosity measurements are carried out at 25° C. As is generally known, the inherent viscosity is a measure of the molecular weight of a polymer.

In the formulae I to IV, the individual symbols $R_1$, $R_2$, $R_3$ and $R_4$ can have different meanings; it is also possible to use several polyamide-acids which differ from one another but are of consistent structure in themselves.

If $R_1$ and $R_3$ are carbocyclic-aromatic radicals, these preferably have at least one 6-membered ring; in particular, they are monocyclic radicals, condensed polycyclic radicals, or polycyclic radicals with several cyclic, condensed or non-condensed systems, which can be linked to one another directly or through bridge members.

As examples of suitable bridge members there may be mentioned:

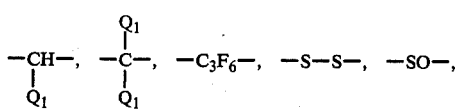

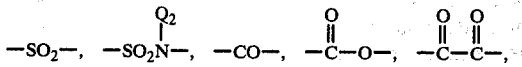

-continued

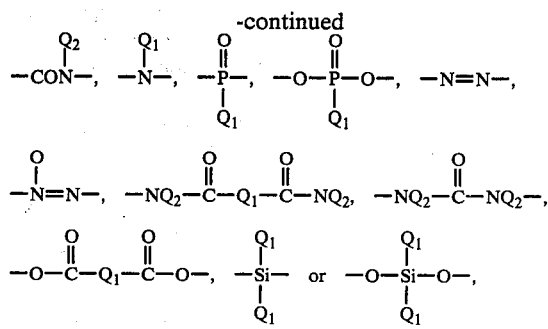

wherein $Q_1$ represents an alkyl radical with 1 to 6, preferably 1 to 4, carbon atoms, which can optionally be substituted by halogen atoms, preferably fluorine, or represents a cycloalkyl or an aryl radical, and $Q_2$ represents hydrogen, an alkyl radical with 1 to 4 carbon atoms, which can optionally be substituted by halogen atoms, a cycloalkyl radical or an aryl radical.

Such radicals can also be bonded to one another through two bridge members, such as two —$SO_2$— groups.

If $R_1$ and $R_3$ denote heterocyclic-aromatic radicals, they can in particular be 5-membered or 6-membered heterocyclic-aromatic ring systems containing O, N and/or S, which are optionally benzo-condensed.

Cycloaliphatic radicals represented by $R_1$ or $R_3$ are above all 5-membered or 6-membered cycloalkyl radicals. Cycloaliphatic, carbocyclic-aromatic or heterocyclic-aromatic radicals represented by $R_1$ and $R_3$ can also be substituted, for example by nitro groups, alkyl groups with 1 to 4 carbon atoms, trifluoromethyl groups, halogen atoms, especially fluorine, sulphamoyl groups or silyl groups.

If $R_1$ is an aliphatic radical, this is preferably an unsubstituted straight or branched alkylene radical with 2 to 10, especially 4 to 10, carbon atoms.

Radicals represented by $R_2$ or $R_4$ can be unsubstituted or substituted, for example by halogen atoms, such as fluorine, chlorine or bromine, especially, however, by alkyl or alkoxy groups each with 1 to 4 carbon atoms.

If $R_2$ and/or $R_4$ are uncondensed bicyclic aromatic radicals, possible bridge members are the groups mentioned in the preceding text when discussing $R_1$ and $R_3$. If $R_2$ or $R_4$ denote heterocyclic-aromatic radicals, these are in particular heterocyclic-aromatic 5-membered or 6-membered rings containing O, N and/or S.

Possible aliphatic radicals $R_2$ and $R_4$ are in particular straight or branched alkylene radicals with 2 to 12 carbon atoms, and the alkylene chain can also be interrupted by hetero-atoms, such as O, S or N atoms.

If $R_2$ and/or $R_4$ denote a cycloaliphatic radical they represent, for example, cyclohexyl or dicyclohexylmethane radicals, whilst as araliphatic radicals they can above all be 1,3-, 1,4- or 2,4-bis-alkylenebenzene radicals, 4,4'-bis-alkylene-diphenyl radicals and 4,4'-bis alkylene-diphenylether radicals.

According to a first preferred embodiment, polyamide/polyamide-acid copolymers and the derivatives cyclized to the corresponding polyamide/polyimide copolymers, are provided, by reacting a polyamide-acid of formula IV, and especially a polyamide-acid of formula I with a diamine of formula II and a dicarboxylic acid dichloride of formula III and optionally subsequently cyclizing the resulting polyamide/polyamide-acid copolymer, and wherein $a$ and $b$ are as stated above, $R_2$ an $R_4$ independently of one another represent a monocyclic aromatic radical which may be substituted by alkyl or alkoxy groups having each 1 to 4 carbon atoms, or an uncondensed bicyclic aromatic radical which may be substituted by alkyl or alkoxy groups having each 1 to 4 carbon atoms, and in which the aromatic nuclei are bonded to one another through the bridging member —O— or —$CH_2$—; $R_1$ denotes an unsubstituted monocyclic aromatic radical, with the carbonyl groups being bonded to different carbon atoms, and $R_3$ represents an unsubstituted monocyclic, condensed polycyclic or uncondensed bicyclic aromatic radical in which bicyclic aromatic radical the aromatic nuclei are bonded to one another through the bridging member —O— or

the carbonyl and carboxyl groups are bonded to different ring carbon atoms, and adjoin each other in pairs, and the carbonyl groups of the anhydride end groups are located on adjacent ring carbon atoms.

A further preferred class of products are polyamide/polyamide-acid copolymers and the derivatives cyclized to the corresponding polyamide/polyimide copolymers, which are prepared by reacting a polyamide-acid of formula IV and especially a polyamide-acid of formula I with a diamine of formula II and a dicarboxylic acid dichloride of formula III ad optionally subsequently cyclizing the resulting polyamide/polyamide-acid copolymer, and wherein $a$ denotes an integer from 8 to 60 and $b$ denotes an integer from 4 to 50, with the proviso that, when $b$ represents an integer of from 8 to 50, $a$ is an integer at least equal to $b$, $R_2$ and $R_4$ independently or one another represent a monocyclic aromatic radical which may be substituted by alkyl or alkoxy groups having each 1 to 4 carbon atoms, an uncondensed bicyclic aromatic radical which may be substituted by alkyl or alkoxy groups having each 1 to 4 carbon atoms, and in which the aromatic nuclei are bonded to one another through the bridging member —O— or —$CH_2$—, or an unsubstituted straight or branched alkylene radical having from 2 to 12 carbon atoms; $R_1$ denotes an unsubstituted straight or branched alkylene radical having from 2 to 10 carbon atoms or an unsubstituted monocyclic aromatic radical, with the carbonyl groups being bonded to different carbon atoms, and $R_3$ represents an unsubstituted monocyclic, condensed polycyclic or uncondensed bicyclic aromatic radical, in which bicyclic aromatic radical the aromatic nuclei are bonded to one another through the bridging member —O— or

the carbonyl and carboxyl groups are bonded to different ring carbon atoms, and adjoin each other in pairs, and the carbonyl groups of the anhydride end groups are located on adjacent ring carbon atoms.

Particularly preferred compounds are polyamide/polyamide-acid copolymers and the derivatives cyclized to the corresponding polyamide/polyimide copolymers which are prepared by reacting a polyamide-acid of formula I with a diamine of formula II and a dicarboxylic acid dichloride of formula III and optionally subsequently cyclizing the resulting polyamide/ polyamide-acid copolymer, and wherein $a$ denotes an integer from 10 to 60, and $b$ denotes an integer from 4 to 50, with the proviso that $a$ is at least equal to $b+6$, $R_1$ represents a radical having the formula $-(CH_2)_x$ wherein $x$ is an integer from 4 to 10, $R_2$ represents the 4,4'-diphenylyl-ether, the 4,4'-diphenylyl-methane or 1,3-phenylene radical, $R_3$ represents a benzene ring or the benzophenone ring system and $R_4$ represents the 4,4'-diphenylyl-ether, 4,4'-diphenylyl-methane or 1,3- or 1,4-phenylene radical.

Very particularly preferred are polyamide/polyamide-acid copolymers and the corresponding cyclized derivatives which are prepared by reacting a polyamide-acid of formula I with a diamine of formula II and a dicarboxylic acid dichloride of formula III, and optionally cyclizing the resulting polyamide/polyamide-acid, and wherein $a$, $b$, $R_2$, $R_3$ and $R_4$ are as defined in the preceding paragraph, and $R_1$ represents the 1,3-phenylene radical.

According to a further preferred embodiment, $a$ represents an integer of at most 30, and $b$ represents an integer of at most 20.

The starting products of the formulae I to IV which can be used according to the invention are in themselves known or can be manufactured in a known manner.

For example, polyamide-acids of the formula IV can be obtained by reacting tetracarboxylic acid dianhydrides of the formula

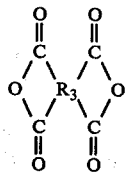

with an excess of a diamine of the formula $H_2N-R_4-NH_2$.

The following may be mentioned as examples of suitable tetracarboxylic acid dianhydrides:
pyromellitic acid dianhydride, 3,3', 4,4'-benzophenonetetracarboxylic acid dianhydride, 2,3,3',4'-benzophenonetetracarboxylic acid dianhydride, 2,2',3,3'-benzophenonetetracarboxylic acid dianhydride, 4,4',5,5',6,6'-hexafluorobenzophenone-2,2',3,3'-tetracarboxylic acid dianhydride, 3,3',4,4'-diphenyl-tetracarboxylic acid dianhydride, 2,2',3,3'-diphenyl-tetracarboxylic acid dianhydride, bis-(2,3-dicarboxyphenyl)-methane dianhydride, bis-(3,4-dicarboxyphenyl)-methane dianhydride, bis-(2,5,6-trifluoro-3,4-dicarboxyphenyl)-methane dianhydride, 1,1-bis-(3,4-dicarboxyphenyl)-ethane dianhydride, 2,2-bis-(3,4-dicarboxyphenyl)-propane dianhydride, 2,2-bis-(2,3-dicarboxyphenyl)-propane dianhydride, bis-(3,4-dicarboxyphenyl)-ether dianhydride, bis-(2,3-dicarboxyphenyl)-ether dianhydride, bis-(2,5,6-trifluoro-3,4-dicarboxyphenyl)-ether dianhydride, bis-(3,4-dicarboxyphenyl)-sulphone dianhydride, bis-(2,5,6-trifluoro-3,4-dicarboxyphenyl)-sulphone dianhydride, bis-(3,4-dicarboxyphenyl)-phenylphosphonate dianhydride, bis-(3,4-dicarboxyphenyl)-phenylphosphine oxide dianhydride, N,N-(3,4-dicarboxyphenyl)-N-methylamine dianhydride, bis-(3,4-dicarboxyphenyl)-diethylsilane dianhydride, bis-(3,4-dicarboxyphenyl)-tetramethyldisiloxane dianhydride, 3,3',4,4'-tetracarboxybenzoyloxybenzene dianhydride, 1,4,5,8-naphthalene-tetracarboxylic acid dianhydride, 2,3,6,7-naphthalene-tetracarboxylic acid dianhydride, 1,2,5,6-naphthalene-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, 1,4,5,8-tetrafluoronaphthalene-2,3,6,7-tetracarboxylic acid dianhydride, phenanthrene-1,8,9,10-tetracarboxylic acid dianhydride, 3,4,9,10-perylene-tetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, tetrahydrofurane-2,3,4,5-tetracarboxylic acid dianhydride, 3,3',4,4-azobenzene-tetracarboxylic acid dianhydride, 3,3',4,4'-azoxybenzene-tetracarboxylic acid dianhydride, 1,2,3,4-cyclopentanetetracarboxylic acid dianhydride and dianhydrides of the formula

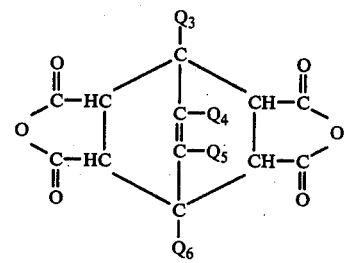

in which $Q_3$, $Q_4$, $Q_5$ and $Q_6$ independently of one another denote hydrogen, halogen, alkyl, cycloalkyl, phenyl, aralkyl, acyl or an optionally esterified or etherified hydroxyl group, for example bicyclo[2.2.2]octene-7-tetracarboxylic acid-2,3,5,6-dianhydride.

To manufacture polyamide-acids of formula I, diamines of the formula $H_2N-R_4-NH_2$ are reacted with an excess of a tetracarboxylic acid anhydride, for example the tetracarboxylic acid dianhydrides previously mentioned.

Pyromellitic acid dianhydride and benzophenonetetracarboxylic acid dianhydrides are used preferentially for the preparation of polyamide-acids of formulae I and IV.

Examples of dicarboxylic acid dichlorides of formula III are: terephthalic acid dichloride, thiophene-2,5-dicarboxylic acid dichloride, benzo [1,2-d:5,4-d']bisoxazole-2,6-dicarboxylic acid dichloride, succinic acid dichloride, glutaric acid dichloride, suberic acid dichloride and especially adipic acid dichloride and sebacic acid dichloride, but above all isophthalic acid dichloride.

The diamines of formula II as well as those of the formula $H_2N-R_4-NH_2$ are in themselves known.

As specific examples of aromatic diamines conforming to the definition there may be mentioned: o-, m- and p-phenylenediamine, diaminotoluenes, such as 2,4-diaminotoluene, 1,4-diamino-2-methoxybenzene, 2,5-diaminoxylene, 1,3-diamino-4-chlorobenzene, 1,4-diamino-2,5-dichlorobenzene, 1,4-diamino-2-bromobenzene, 1,3-diamino-4-isopropylbenzene, N,N'-diphenyl-1,4-phenylenediamine, 4,4'-diaminodiphenyl-2,2-propane, 4,4'-diamino-diphenylmethane, 2,2'- or 4,4'-diaminostilbene, 4,4'-diamino-2,2',3,3',5,5',6,6'-octafluorodiphenylmethane, 4,4'-diaminodiphenyl-ether, 4,4'-diamino-2,2',3,3',5,5',6,6'-octafluorodiphenyl-ether, 4,4'-diaminodiphenyl-thioether, 4,4'-diaminodiphenylsulphone, 3,3'-diaminodiphenylsulphone, 4,4'-diaminobenzoic acid phenyl ester, 2,2'- or 4,4'- diaminobenzophenone, 4,4'-diaminobenzil, 4-(4'-aminophenylcarbamoyl)-aniline, bis-(4-aminophenyl)-phosphine oxide, bis-(4-aminophenyl)-methylphosphine oxide, bis-(3-aminophenyl)-methylphosphine oxide, bis-(4-aminophenyl)-phenylphosphine oxide, bis-(4-aminophenyl)-cyclohexylphosphine oxide, N,N-bis-(4-aminophenyl)-N-phenylamine, N,N-bis-(4-aminophenyl)-N-methylamine, 2,2'-, 3,3'- or 4,4'-diaminoazobenzene, 4,4'-diaminodiphenylurea, 1,8- or 1,5-diaminonaphthalene, 1,5-diaminoanthraquinone, diamino-fluoranthene, 3,9-diaminochrysene, diamino-pyrene, bis-(4-aminophenyl)-diethylsilane, bis-(4-aminophenyl)-dimethylsilane and bis-(4-aminophenyl)-tetramethyldisiloxane.

As compounds of the formula $H_2N-R_2-NH_2$, 4,4'-diaminodiphenylyl-ether, 4,4'-diphenylyl-methane and 1,3-phenylenediamine are particularly preferred, whilst as compounds of the formula $H_2N-R_4-NH_2$, 4,4'-diaminodiphenylyl-ether, 4,4'-diaminodiphenylylmethane and 1,3- and 1,4-phenylenediamine are particularly preferred.

Examples of heterocyclic-aromatic diamines are: 2,6-diaminopyridine, 2,4-diaminopyrimidine, 3,6-diaminoacridine, 2,4-diamino-s-triazine, 2,7-diaminodibenzofurane, 2,7-diaminocarbazole, 3,7-diaminophenothiazine, 5,6-diamino-1,3-dimethyl-uracil and 2,5-diamino-1,3,4-thiadiazole.

As aliphatic diamines there may be mentioned: dimethylenediamine, trimethylenediamine, tetramethylenediamine, hexamethylenediamine, 2,2,4- and 2,4,4-trimethylhexamethylenediamine, heptamethylenediamine, octamethylenediamine, nonamethylenediamine and decamethylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyhexamethylenediamine, 5-methylnonamethylenediamine, 2,11-diaminododecane, 1,12-diaminooctadecane, 1,2-bis-(3-aminopropoxy)-ethane, N,N'-dimethylethylenediamine, N,N'-diethyl-1,3-diaminopropane and N,N'-dimethyl-1,6-diaminohexane as well as the diamines of the formulae $H_2N(CH_2)_3O(CH_2)_2O(CH_2)_3NH_2$ and $H_2N(CH_2)_3S(CH_2)_3NH_2$.

Finally, 1,4-diaminocyclohexane and 4,4'-diaminodicyclohexylmethane should be mentioned as suitable cycloaliphatic diamines and 1,4-bis-(2-methyl-4-aminopentyl)-benzene, 1,4-bis-(1,1-dimethyl-5-aminopentyl)-benzene, 1,3- or 1,4-bis-(aminomethyl)-benzene, 2,4-bis-[(2'-amino-1',1'-dimethyl)-ethyl]-toluene and bis-[4-(2'-amino-1',1'-dimethyl)ethylphenyl]-ether should be mentioned as araliphatic diamines.

The polyamide-acids of formulae I and IV can also be manufactured by interfacial polycondensation, for example by reaction of appropriate tetracarboxylic acid derivatives with diamines in a mixture of water, N,N-dimethylacetamide and tetrahydrofurane.

The present invention also relates to a process for preparing the polyamide/polyamide-acid copolymers having an inherent viscosity of 0.1 to 2.5 as hereinbefore defined, and the derivatives cyclized to the corresponding polyamide/polyimide copolymers, which comprises
(i) reacting a polyamide-acid having an average molecular weight of 750 to 20,000, of formula I, with a diamine of formula II and with a dicarboxylic acid dichloride of formula III, in a molar ratio of 1 to $a$ to $a$-1, or reacting a polyamide-acid having an average molecular weight of 750 to 20,000, of formula IV, with a dicarboxylic acid dichloride of formula III and with a diamine of formula II, in a molar ratio of 1 to $a$ to $a$-1, $a$ being as defined hereinbefore, in an anhydrous organic aprotic solvent or a mixture of such solvents, with the exclusion of moisture, at temperatures between about $-20°$ C. and $+50°$ C., and (ii) optionally cyclizing the polyamide/polyamide-acid copolymer obtained by heating to temperatures between about 100° C. and 300° C., or by treatment with a dehydrating agent by itself or mixed with a tertiary amine.

A preferred embodiment of carrying out the above process consists in first adding a dicarboxylic acid dichloride of formula II to a polyamide-acid of formula I, followed by the addition of a diamine of formula II, or, vice-versa, first adding a diamine of formula II to a polyamide-acid of formula IV, followed by the addition of a dicarboxylic acid dichloride of formula III. Thereby, block-like polyamide/polyamide-acid copolymers with major portions of consecutive polyamide-units can be obtained.

The reaction step (i) is preferably conducted under nitrogen, and at temperatures between about $-15°$ C. to $+10°$ C. Suitable organic aprotic solvents are: N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-$\epsilon$-caprolactam, hexamethylphosphoric acid triamide (hexametapol), N,N,N',N'-tetramethylurea, tetrahydrothiophene dioxide (sulpholane) and dimethylsulphoxide.

The reaction can also be carried out in mixtures of such solvents. On the other hand it is also possible to dilute these preferred solvent systems with other organic aprotic solvents, such as aromatic, cycloaliphatic or aliphatic, optionally chlorinated hydrocarbons, for example benzene, toluene, xylenes, cyclohexane, pentane, hexane, petroleum ether, methylene chloride, tetrahydrofurane, cyclohexanone and dioxane.

After completion of the reaction the solvents can be removed in the usual manner if desired, for example by distillation, if appropriate under reduced pressure. Copolymers manufactured according to the invention can however also be precipitated according to known methods by pouring the reaction solution into a precipitant, such as water or aliphatic hydrocarbons, for example petroleum ether, but especially methanol, diethyl ether, diethers of monoethylene glycol, diethylene glycol or triethylene glycol, or acetonitrile and the like, and be dried if desired.

The cyclization of the polyamide/polyamide-acid copolymers obtained according to the invention to give the corresponding polyamide-polyimide copolymers — before, during or after processing — is carried out in a manner which is in itself known, preferably by heating to temperatures between about 100° and 300° C., or by treatment with a dehydrating agent by itself or mixed with a tertiary amine; examples to be mentioned are acetic anhydride, propionic anhydride and dicyclohexylcarbodiimide or a mixture of acetic anhydride and triethylamine or pyridine.

The copolymers manufactured according to the invention are distinguished by good processability and can be used in a technically simple manner, which is in itself known, for the manufacture of industrial products such as films (or sheets), fibres, fibre-reinforced composite materials, laminates, castings, honeycomb core material, lacquers, adhesives, foams, coating compositions, paper and the like but can especially be used for the manufacture of compression moulding powders and laminates.

For these purposes, customary additives, such as pigments, fillers, electrical conductors, for example carbon black or metal particles, agents for improving the abrasion resistance, lubricants or reinforcing fibres, for example carbon fibres, boron fibres or glass fibres, can be added to the copolymers before or after shaping. For example, foams are obtained by adding customary blowing agents and, optionally, fillers to the polymers before processing or by blowing air, carbon dioxide, nitrogen or the like into the polymer mass or polymer solution. Laminates which contain copolymers manufactured according to the invention can optionally be provided with coating layers which improve the surface properties, for example layers of phenolic resins, aluminium and the like, and are used, inter alia, in aircraft construction.

Copolymers conforming to the definition, preferably in the form of solutions, can also be used as coating compositions and adhesives and the like, optionally with the addition of pigments, such as titanium dioxide and the customary fillers and foaming agents and the like, for covering and coating substrates of the most diverse kind in any desired shape, such as films, fibres, fibre fleeces, wires, grid-like structures, fabrics, foams and the like. As suitable substrates there may be mentioned: metals, such as copper, brass, aluminium, iron and steel; asbestos fibre materials and glass fibre materials; polymers, such as cellulosic materials (cellulose esters or cellulose ethers, paper and the like); perfluorocarbon polymers, such as polytetrafluoroethylene; polyolefines, polyesters, polyamides, polyimides, polyurethanes and the like.

In the following Examples, $\overline{M}_{PA}$ and $\overline{M}_{PAA}$ denote the mean molecular weight of the polyamide block and polyamide-acid block, respectively.

EXAMPLE 1

2.181 g (0.01 mol) of pyromellitic acid dianhydride are suspended in 50 g of anhydrous N,N-dimethylacetamide under nitrogen in a 500 ml sulphonation flask equipped with a stirrer, internal thermometer, dropping funnel with pressure equilibration device, and nitrogen inlet tube. A solution of 2.503 g (0.0125 mol) of 4,4'-diaminodiphenylether in 50 g of anhydrous N,N-dimethylacetamide is then added dropwise at 5°–20° C., whereupon the pyromellitic acid dianhydride slowly dissolves. Thereafter, the reaction mixture is stirred for 1 hour at 20°–25° C.

8.629 g (0.0425 mol) of isophthalic acid dichloride in the solid form, followed by 4.326 g (0.04 mol) of m-phenylenediamine dissolved in 200 ml of anhydrous N,N-dimethylacetamide, are successively introduced into the resulting solution of a polyamide-acid block having amino end groups. The reaction mixture is then stirred for one hour at −5° C., 8.60 g (0.085 mol) of triethylamine are added and after a further hour the triethylamine hydrochloride which has precipitated is filtered off.

The resulting solution of the polyamide/polyamide-acid copolymer ($\overline{M}_{PA}$ 4,000, $\overline{M}_{PAA}$ 2,000) can be converted into films in the usual manner. After cyclisation, carried out chemically or thermally, the polyamide-polyimide copolymer has an inherent viscosity of 0.91 dl/g (c = 0.5% in concentrated $H_2SO_4$, 20° C.).

EXAMPLE 2

A polyamide-acid solution is prepared in accordance with the process described in Example 1 from 2.726 g (0.0125 mol) of pyromellitic acid dianhydride, 2.002 g (0.01 mol) of 4,4'-diaminodiphenyl-ether and 100 ml of anhydrous N,N-dimethylacetamide. 4.596 g (0.0425 mol) of solid m-phenylenediamine are added to this solution at 20° C. After the reaction mixture has been cooled to −20° C., 8.132 g (0.04 mol) of isophthalic acid dichloride are introduced in portions in such a way that the temperature does not exceed −5° C. After stirring for one hour at −5° C. and subsequently stirring for three hours at 20° C., 8.096 g (0.08 mol) of triethylamine are added dropwise to the clear solution obtained, at 5°–20° C. The reaction mixture is stirred for a further hour at 20° C. and the triethylamine hydrochloride which has precipitated is then filtered off. A clear polyamide/polyamide-acid solution is obtained, which is suitable for the manufacture of films and compression moulding powders, but especially for the manufacture of laminates, according to methods which are in themselves known; $\overline{M}_{PA}$ 4,000, $\overline{M}_{PAA}$ 2,000; $\eta_{inh}$.PA−PAA = 0.82 dl/g (c = 0.5% in DMA).

EXAMPLE 3

A polyamide-acid solution is prepared in accordance with the process described in Example 1 from 3.223 g (0.010 mol) of 3,3',4,4'-benzophenonetetracarboxylic acid dianhydride, 2.4784 g (0.0125 mol) of 4,4'-diaminodiphenyl-ether and 100 ml of anhydrous N,N-dimethylacetamide. 8.629 g (0.0425 mol) of isophthalic acid dichloride in the solid form, followed by 8.0096 g (0.40 mol) of 4,4'-diaminodiphenylether in 200 ml of anhydrous N,N-dimethylacetamide, are successively introduced into this solution. Thereafter the reaction mixture is stirred for one hour at −5° C., 8.60 g (0.085 mol) of triethylamine are added and after a further hour the triethylamine hydrochloride which has precipitated is filtered off.

A solution of a polyamide/polyamide-acid copolymer with $\overline{M}_{PA}$ 5,500 and $\overline{M}_{PAA}$ 2,000 is obtained; $\eta_{inh}$ PA−PAA = 0.63 dl/g (c = 0.5 in DMA at 25° C.).

To manufacture a compression moulding powder, the polyamide/polyamide-acid solution is added dropwise, under nitrogen, to 350 g of a mixture of 3 parts by volume of pyridine and 2 parts by volume of acetic anhydride and the whole is stirred for 20 hours at approx. 25° C. A yellow, jelly-like suspension is produced. This is added dropwise to 5.6 l of water and the resulting suspension is homogenised with a "Turrax" mixer. The resulting yellow powder is filtered off, taken up in 2 l of water and again homogenised in the mixer. This operation is repeated once more, after which the filter residue is dried for 16 hours at 125° C./100 mm Hg and subsequently for 24 hours at 200° C./0.01 mm Hg. After grinding, 23 g of a compression moulding powder of the appropriate polyamide-polyimide block copolymer are obtained.

A compression moulding powder can also be obtained by adding the polyamide/polyamide-acid solution manufactured according to the above example dropwise to 2 l of a mixture of 1 part of water and 1 part of methanol at approx. 25° C., with vigorous stirring. A fibrous product precipitates, which is left for 16 hours in the precipitant and is then filtered off. The resulting polyamide/polyamide-acid block copolymer is then cyclised in a drying cabinet under vacuum at a temperature between 70 and 200° C. and the resulting product is subsequently mechanically comminuted.

EXAMPLE 4

Glass fibre fabric (for example so-called E-glass with an aminosilane finish) is impregnated with the polymer solution manufactured according to Example 2 by a single pass of the fabric through the polymer solution. Thereafter the impregnated fabric is dried as follows in a drying cabinet: 3 hours at 70° C./50 mm Hg, 2 hours at 100° C./50 mm Hg, 2 hours at 130° C./50 mm Hg, then 8 hours at 150°/20 mm Hg and finally 5 hours at 200° C./$10^{-2}$ mm Hg. Several of the dried prepregs obtained are stacked on top of one another and then pressed in a sheet press at 300° C. to give laminates, the pressing being carried out under the following conditions: 1 minute contact pressure; 1 minute at 10 kp/cm$^2$, 1 minute at 15 kp/cm$^2$ and 1 minute at 30 kp/cm$^2$. Laminates having a good bond strength and good flexural strength are obtained.

EXAMPLE 5

The compression moulding powder manufactured according to Example 3 is introduced, as loose material or in the form of cold-precompacted tablets, into a compression mould for standard bars and is pressed at 300° C. under the following conditions: 15 minutes contact pressure followed by an increase in pressure to 1,000 kp/cm$^2$ over the course of 2 minutes and maintenance of this pressure for 5 minutes. Thereafter the compression mould is cooled under load to 200° C. and the samples are released. Transparent, bubble-free compression mouldings of good flexural strength are obtained.

To manufacture sheets, a thin layer of the above fine powder is introduced into a circular compression mould and compacted at a temperature of 150° C. and a pressure of 500 kp/cm$^2$. Thereafter the preformed disc obtained is pressed under the following conditions in a sheet press at 300° C: 3 minutes contact pressure, 1 minute at 30 kp/cm$^2$ and 1 minute at 40 kp/cm$^2$. Bubble-free, transparent sheets are obtained.

EXAMPLE 6

A polyamide-acid solution is prepared by the method described in Example 1, using 7.2502 g (0.0225 mol) of 4,4',3,3'-benzophenone-tetracarboxylic acid dianhydride, 3.0036 g (0.015 mol) of 4,4'-diaminodiphenylether and 190 ml of anhydrous N,N-dimethylacetamide. The resultant yellow viscous solution is cooled to −20° C., and 28.8288 g (0.1575 mol) of adipic acid dichloride are added at this temperature. Thereafter, at −20° C. to −15° C., a solution of 17.8431 g (0.165 mol) m-phenylene-diamine in 100 ml of N,N-dimethylacetamide is added, and the reaction mixture is stirred until the temperature thereof has reached 20-25° C. A clear solution is obtained. At 10° C. to 20° C., 31.9 g (0.315 mol) of triethylamine are added, and the reaction mixture is stirred during 30 minutes; thereafter the triethylamine hydrochloride which has precipitated is filtered off.

This solution can be used for the preparation of films, laminates and such. After cyclization, carried out chemically or thermally, the copolymer can be used for the preparation of compression moulding powders.

$\overline{M}_{PA}$ 5,000, $\overline{M}_{PAA}$ 1,000; inherent viscosity of the polyamide/polyamide-acid copolymer = 0.61 dl/g (c = 0.5% in N,N-dimethylacetamide).

EXAMPLE 7

The same procedure as in Example 6 is followed, using, however, 24.1672 g (0.075 mol) of 4,4',3,3'-benzophenonetetracarboxylic acid dianhydride and 17.521 g (0.0875 mol) of 4,4'-diaminodiphenylether in 500 ml of anhydrous N,N-dimethylacetamide. A solution of a polyamide-acid having terminal amino groups is obtained. 16.221 g (0.15 mol) of m-phenylenediamine in the solid form are added to this solution at −20° C. Then 38.8602 g (0.1625 mol) of sebacic acid dichloride are added dropwise at the same temperature. A highly viscous solution is formed which is stirred until the temperature thereof has reached 20-25° C. The hydrochloric acid formed during the reaction is precipitated as described in Example 6, by adding 32.88 g (0.325 mol) of triethylamine, and removing the triethylamine hydrochloride. This solution can be used for the preparation of films and laminates or converted into compression moulding powders as described in the preceding Examples.

$\overline{M}_{PA}$ 3,000, $\overline{M}_{PAA}$ 3,000; inherent viscosity of PA—PAA = 0.91 dl/g (c = 0.5% in N,N-dimethylacetamide).

EXAMPLES 8–10

Further polyamide/polyamide-acid copolymers are prepared by the methods described in the preceding Examples, and using the reactants indicated below.

EXAMPLE 8

Polyamide-acid block prepared by using 6.5439 g (0.030 mol) of pyromellitic acid dianhydride and 4.4611 g (0.0225 mol) of 4,4'-diaminodiphenylmethane. The solution containing said polyamide-acid is first admixed with 31.9772 g (0.1575 mol) of isophthalic acid dichloride and then with 17.8431 g (0.165 mol) of m-phenylenediamine. The hydrochloric acid formed during the reaction is precipitated by adding 31.8748 g (0.315 mol) of triethylamine.

$\overline{M}_{PA}$ 5,000, $\overline{M}_{PAA}$ 1,500; inherent viscosity PA−PAA = 0.65 dl/g (c = 0.5% in N,N-dimethylacetamide).

EXAMPLE 9

Polyamide-acid block prepared by using 7.2502 g (0.0225 mol) of 4,4',3,3'-benzophenone-tetracarboxylic acid dianhydride and 1.6221 g (0.015 mol) of p-phenylenediamine. The solution containing said polyamide-acid is first admixed with 31.9772 g (0.1575 mol) of isophthalic acid dichloride and then with 17.8431 g (0.165 mol) of m-phenylenediamine. The hydrochloric acid formed during the reaction is precipitated by adding 31.8748 g (0.315 mol) of triethylamine.

$\overline{M}_{PA}$ 5,000, $\overline{M}_{PAA}$ 1,000; inherent viscosity PA−PAA = 0.74 dl/g (c = 0.5% in N,N-dimethylacetamide).

EXAMPLE 10

Polyamide-acid block prepared by using 12.0836 g (0.0375 mol) of 4,4',3,3'-benzophenone-tetracarboxylic acid dianhydride and 4.7484 g (0.030 mol) of a mixture of isomers consisting of 2,2,4- and 2,4,4-trimethyl-hexamethylenediamine. The solution containing said polyamide-acid is first admixed with 25.2794 g (0.1275 mol) of 4,4'-diaminodiphenylmethane and then with 24.3636 g (0.120 mol) of isophthalic acid dichloride. The hydrochloric acid formed during the reaction is precipitated by adding 24.2856 g (0.240 mol) of triethylamine.

$\overline{M}_{PA}$ 5,500, $\overline{M}_{PAA}$ 2,000; inherent viscosity PA—PAA = 0.76 dl/g (c = 0.5% in N,N-dimethylacetamide).

What we claim is:

1. A process for preparing a polyamide/polyamide-acid copolymer having an inherent viscosity of 0.1 to 2.5 or the derivative cyclized to the corresponding polyamide-polyimide copolymer, which comprises (i) reacting a polyamide-acid having an average molecular weight of 750 to 20,000 of formula I

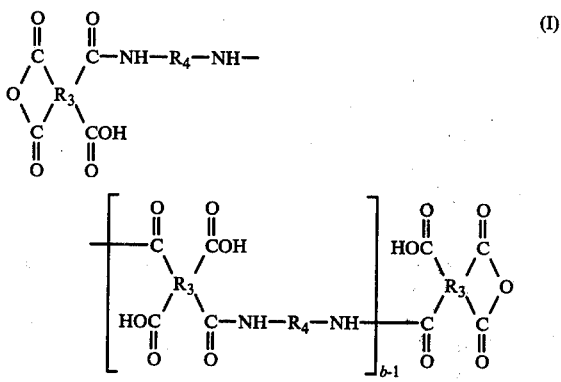

with a diamine of formula II

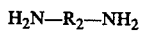

and with a dicarboxylic acid dichloride of formula III

in a molar ratio of 1 to a to a−1, or reacting a polyamide-acid having an average molecular weight of 750 to 20,000, of formula IV

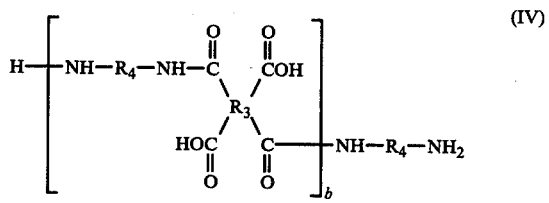

with a dicarboxylic acid dichloride of formula III and with a diamine of formula II, in a molar ratio of 1 to a to a−1, in which formulae I to IV a represents an integer from 8 to 100, and b represents an integer from 2 to 100, with the proviso that, when b represents an integer from 8 to 100, a represents an integer at least equal to b, $R_2$ and $R_4$ independently of one another denote a monocyclic aromatic radical which may be substituted by alkyl or alkoxy groups each having 1 to 4 carbon atoms, or an uncondensed bicyclic aromatic radical which may be substituted by alkyl or alkoxy groups each having 1 to 4 carbon atoms, and in which the aromatic nuclei are bonded to one another through the bridging member —O— or —CH$_2$—; $R_1$ denotes an unsubstituted monocyclic aromatic radical, with the carbonyl groups being bonded to different carbon atoms; and $R_3$ represents an unsubstituted monocyclic, a condensed polycyclic or an uncondensed bicyclic aromatic radical in which bicyclic aromatic radical the aromatic nuclei are bonded to one another through the bridging member —O— or —CO—, wherein the carbonyl and carboxyl groups are bonded to different ring carbon atoms and adjoin each other in pairs and the carbonyl groups of the anhydride end groups are located on adjacent ring carbon atoms, in an anhydrous organic aprotic solvent or a mixture of such solvents, with the exclusion of moisture, at temperatures between about −20° C. and +50° C., and (ii) optionally cyclizing the polyamide/polyamide-acid copolymer obtained by heating to temperatures between about 100 and 300° C., or by treatment with a dehydrating agent by itself or mixed with a tertiary amine.

2. A polyamide/polyamide acid copolymer or the derivative cyclized to the corresponding polyamide-polyimide copolymer prepared according to the process of claim 1.

3. A polyamide/polyamide-acid copolymer and the derivative cyclized to the corresponding polyamide-/polyimide copolymer, prepared according to claim 1 by reacting a polyamide-acid of formula I with a diamine of formula II and a dicarboxylic acid dichloride of formula III and optionally subsequently cyclizing the resulting polyamide/polyamide-acid copolymer, and wherein a denotes an integer from 10 to 60 and b denotes an integer from 4 to 50 with the proviso that a is at least equal to b+6, $R_1$ represents the 1,3-phenylene radical, $R_2$ represents the 4,4'-diphenylyl-ether, 4,4'-diphenylyl-methane or 1,3-phenylene radical, $R_3$ represents a benzene ring or the benzene ring system, and $R_4$ represents the 4,4'-diphenylyl-ether, 4,4'-diphenylyl-methane or 1,3- or 1,4-phenylene radical.

4. A polyamide/polyamide-acid copolymer prepared according to claim 1 by reacting a polyamide-acid having structural units of the formula

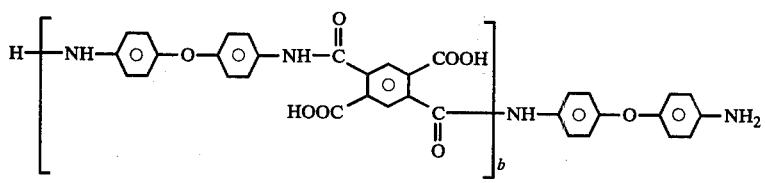

wherein b represents an integer from 4 to 50, with isophthaloyldichloride and m-phenylenediamine.

5. A polyamide/polyamide-acid copolymer prepared according to claim 1 by reacting a polyamide-acid hav-ing structural units of the formula

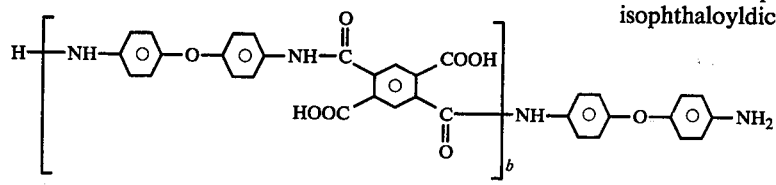
wherein $b$ represents an integer from 4 to 50, with isophthaloyldichloride and 4,4'-diaminodiphenylether.
* * * * *